July 22, 1958
R. J. EHRET
2,844,717
CONTROL APPARATUS
Filed July 3, 1953
3 Sheets-Sheet 1
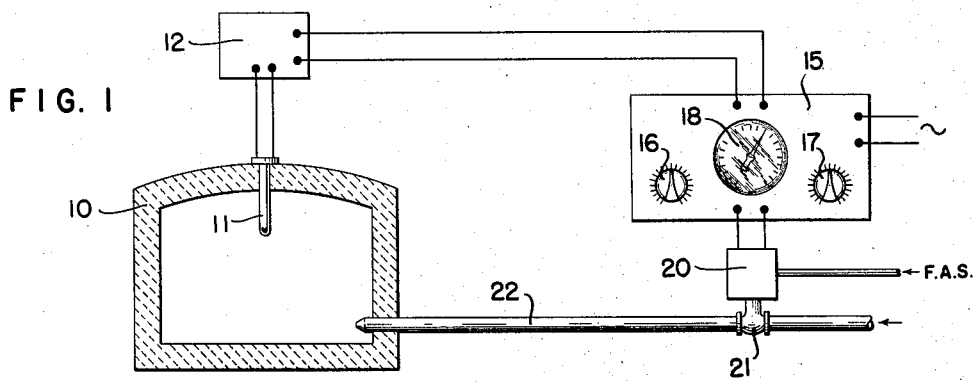
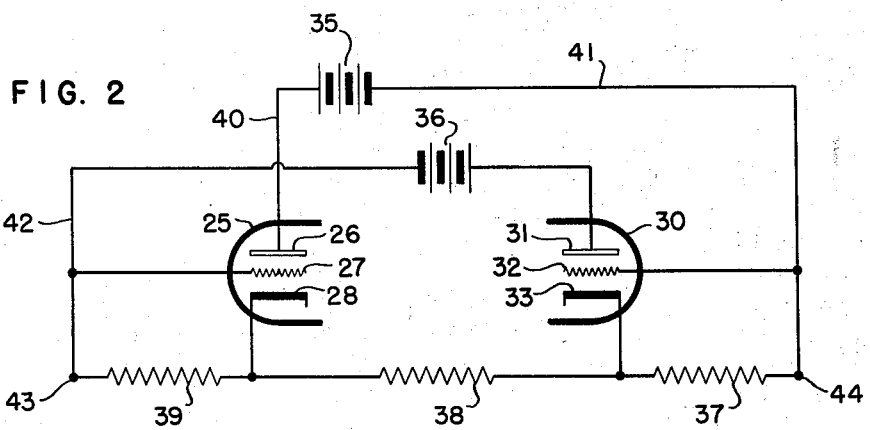
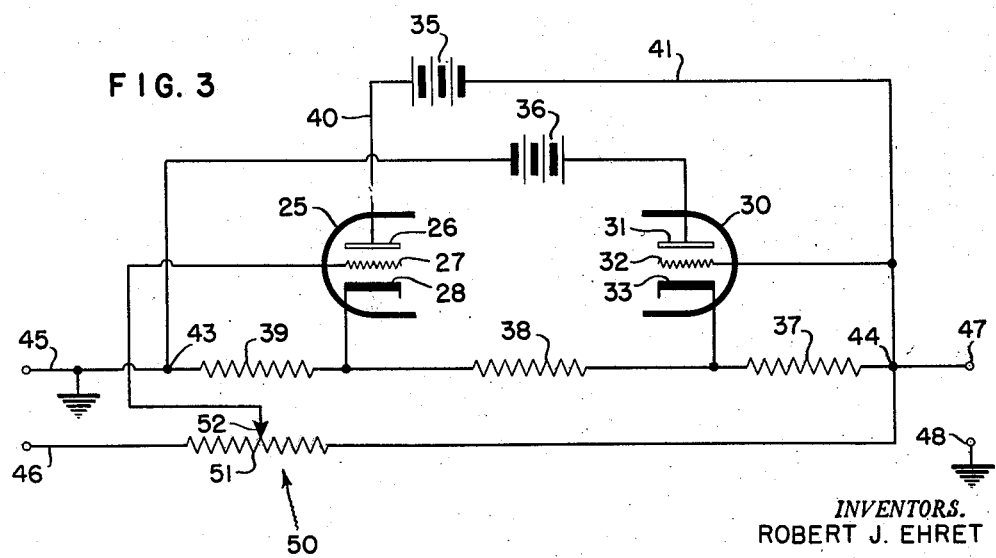
*INVENTORS.*
ROBERT J. EHRET
BY
*Arthur H. Swanson*
ATTORNEY July 22, 1958

R. J. EHRET 2,844,717

CONTROL APPARATUS

Filed July 3, 1953

INVENTOR.
ROBERT J. EHRET
BY
Arthur H. Swanson
ATTORNEY.

United States Patent Office 2,844,717
Patented July 22, 1958

2,844,717

CONTROL APPARATUS

Robert J. Ehret, Philadelphia, Pa., assignor to Minneapolis-Honeywell Regulator Company, Minneapolis, Minn., a corporation of Delaware Application July 3, 1953, Serial No. 365,982

10 Claims. (Cl. 250—27)

A general object of the present invention is to provide an improved electrical amplifier which produces an output electrical signal which varies in accordance with the magnitude of an input signal. More specifically, the invention is concerned with an electrical controller which is characterized by its stability, ability faithfully to follow input signals, its electrical balance, and adaptability to proportional amplification as well as its adaptability to provide so-called integrated or reset responses.

In present day control problems associated with process control, it is frequently necessary to transmit electrical control signals quickly and accurately to some considerably remote position where some controlling action may take place. Such control signals may be due to changes in a process variable such as, for example, pressure, temperature, flow, liquid level, etc. A controller which is used in such a process control must have means for adjusting the amount of control action of an output controller relative to unit changes in input signal. This is generally referred to as a throttling or proportional control. Further, there are certain processes where the magnitude of certain of the variables may tend to droop or be displaced from the actual value which is desired. Such droop is generally attributed to changes in the loading of the process, changes in furnace gas B. t. u., or some other change depending upon the process under control. It is desirable that this droop be sensed and that appropriate resetting of the controller take place to eliminate the droop. The obtaining of the proportional and reset functions in a control system have been found most conveniently accomplished by means of the amplifier circuit of the controller. It is this amplifier which forms the basis for the present invention in that it is adapted to ready use in a proportional type control or in a resetting type control, or in a controller incorporating both features.

In the electrical amplifiers of electrical controllers, it is desirable that the output signals shall vary solely in accordance with the input signals and shall be independent of changes in the amplifier circuit parameters, for example, changes in contact potential in the amplifying tubes. Unless circuit designs are undertaken to compensate for such circuit factors as contact potential problems, an amplifier which is stable when first assembled will not necessarily remain stable or balanced after the tubes of the amplifier have aged. Thus, where stable operation over long periods is a requirement, it is essential to incorporate in the controller suitable means to prevent circuit unbalances which occur with aging from affecting the electrical balance or stability of the apparatus. To increase the utility of such a controller, it is also desirable that it follow closely changes in input signal magnitude and polarity.

It is therefore a more specific object of the present invention to provide a new and improved electrical controller which inherently eliminates the tendency to circuit drifting with changes in tube parameters.

Another object of the present invention is to provide a new and improved high gain electrical controller which incorporates a stabilizing feedback which is arranged to prevent circuit unbalance from affecting the overall operation of the controller.

Still another object of the present invention is to provide an improved balanced feedback controller which has an output signal which is a time integral of the input signal.

A further object of the present invention is to provide a new and improved balanced electrical controller which incorporates a simple adjustment permitting desired variations in the proportional band of the controller.

Still another object of the present invention is to provide a new and improved balanced electrical controller which is capable of producing an electrical output which is reversible in polarity.

A further object of the present invention is the provision of a balanced electrical controller which is phase sensitive.

A still further object of the present invention is to provide a new and improved electrical controller incorporating a pair of electronic amplifying devices which are so interconnected as to eliminate circuit unbalances due to the changing of internal circuit characteristics.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Figure 1 shows diagrammatically one use to which the present controller may be put;

Figure 2 shows the basic circuit configuration of the amplifier of the present controller;

Figure 3 shows one manner in which the basic amplifier of the present apparatus may be modified to incorporate a proportional band adjustment;

FIGURE 1

Figure 4:
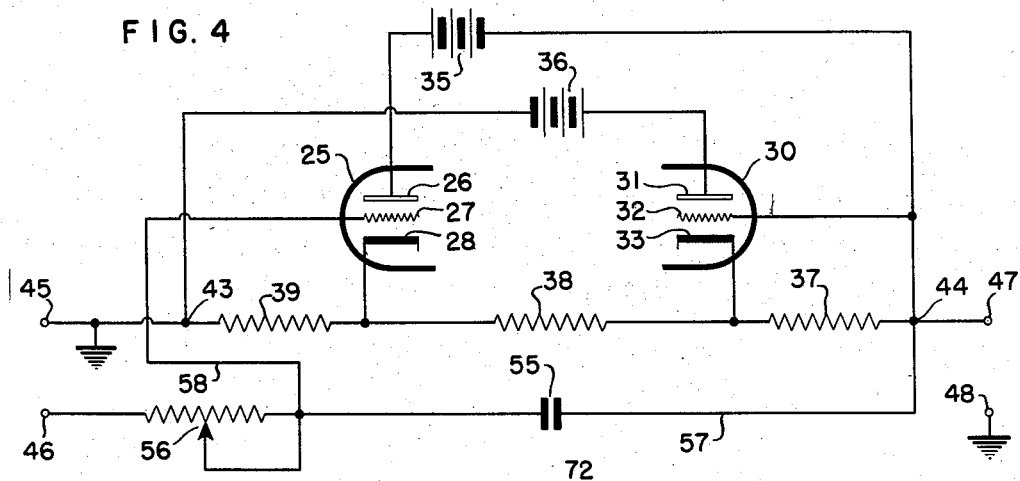
Figure 4 shows a form of the present apparatus wherein the output of the apparatus is an integral of the input.

Referring first to Figure 1, the numeral 10 represents a furnace whose temperature is being controlled. Sensing the temperature in the furnace 10 is a suitable temperature responsive element 11 which may be in the form of a thermocouple or other temperature responsive device. The temperature responsive device 11 is arranged for connection to a suitable amplifying device 12 which may take the form of the apparatus disclosed in the Machlet patent, 2,056,285 issued October 6, 1936. The output of this device 12 is an electrical direct current the magnitude of which is proportional to the temperature sensed by the responsive device 11.

The electrical signal from the device 12 is applied to the input circuit of an electrical controller 15. The controller 15 includes a pair of adjustable members 16 and 17 with the member 16 being arranged to adjust the proportional band of the controller and the member 17 arranged to adjust the integrating or resetting operation of the controller.

The output of the controller 15 may be used to supply an electrical signal to a suitable electric to pneumatic valve actuator 20. The valve actuator 20 is arranged to control the position of the valve 21 thereby to regulate the flow of heating fluid through the conduit 22 to the furnace 10.

FIGURE 2

Referring now to Figure 2, here is shown the basic amplifier section used in the controller 15 of Figure 1. This amplifier apparatus includes a pair of electronic amplifying devices 25 and 30 which may take the form of triodes. The device 25 comprises an anode 26, a control electrode 27, and a cathode 28, the latter of which is arranged to be heated so as to be electron emissive by a heater, not shown. The electronic device 30 comprises an anode 31, a control electrode 32, and a cathode 33, the latter of which is also heated to be electron emissive by a suitable heater, not shown. The amplifying devices 25 and 30 are preferably included in a single envelope so that the aging operation of the two devices will tend to be the same.

The amplifier section of Figure 2 also includes a pair of independent power sources which have been indicated in the present arrangement as batteries 35 and 36. The source 35 is used to supply power to the device 25 by way of a pair of series connected resistors 37 and 38. The source 36 is arranged to supply power to the device 30 by way of a further resistor 39 and the resistor 38.

Operation of Figure 2

Considering the operation of the apparatus of Figure 2, it will be noted that the current flow path for the device 25 may be traced from the positive terminal of the source 35 through conductor 40, anode 26, cathode 28, resistor 38, resistor 37, and conductor 41 back to the negative terminal of the source 35. The current flow path for the device 30 may be traced from the positive terminal of the source 36 through anode 31, cathode 33, resistor 38, resistor 39, and conductor 42 back to the negative terminal of the source 36.

It will be noted that the current flow path for the device 25 includes the resistor 37 and the resistor 38 and that the current flow path for the device 30 includes the resistor 39 and the resistor 38. The two currents flowing through the resistor 38, if the apparatus is balanced and has no input signals, will be of equal magnitude but of opposite direction, and as a result, the voltage drop across the resistor 38 will be zero. Likewise, the voltage drop across the resistor 39 will be the same as that across resistor 37 with their polarities opposite. Thus, between terminals 43 and 44, the net voltage drop will be zero. The terminals 43 and 44 constitute the normal output terminals of the amplifier section. With the resistor 37 connected to the input of the device 30, at control electrode 32 and cathode 33, the input signal to the device 30 will be dependent upon the voltage across the resistor 37 which will be proportional to the current flow through the device 25. There will also be a current flow through the resistor 39 which is connected to the input of the device 25, between the control electrode 27 and the cathode 28, and this current flow establishes a control voltage for device 25. Thus, the current flow through the device 30 will determine the current flow through the resistor 39. Since the current flow through resistor 37 is determined by the conduction of device 25, it will be seen that there is in effect cross regulation or cross current control between the two devices 25 and 30. While the characteristics of the two sections 25 and 30 may tend to change with aging and use, and there may be a resultant change in the current flow through the respective current flow circuits, this change will be relatively ineffective to create an unbalance condition in the output because the voltages added up across the resistors 39, 38, and 37 at terminals 43 and 44 will tend to be zero in the absence of an input or unbalancing signal. While the output may be considered to be at terminals 43 and 44, it may also be taken directly from the resistor 38.

The current flow through the devices 25 and 30 will also be determined by the magnitude of the plate voltage supply, the amplification factor of the devices 25 and 30, and the sizes of the resistors 37, 38, and 39. The stability of the apparatus for proportional operation is determined by the relative values of the resistors 37, 38, and 39, the amplification factors and plate resistances of the devices 25 and 30. For certain values of these quantities, the circuit will behave as a "trigger" circuit.

FIGURE 3

The basic balanced amplifier of Figure 2 is incorporated in Figure 3 and the corresponding components carry the same reference numerals. In the arrangement of Figure 3, there have been added input terminals 45 and 46, a pair of output terminals 47 and 48, and a proportional band adjustment 50. This proportional band adjustment comprises a slide wire 51 and a slider contact 52.

Operation of Figure 3

For convenience in considering the operation of Figure 3, it may be first assumed that the slider 52 of the proportional band adjustment has been adjusted to its extreme left hand position so that the slider 52 is directly connected to the input terminal 46. It may be assumed also that a step input signal, a direct voltage, is applied to the terminals 45 and 46 of the polarity needed to make the terminal 45 negative with respect to the terminal 46. With the assumed adjustment of the slider contact 52, it will be noted that the control electrode 27 of the device 25 is connected directly to the input terminal 46 by way of the slider contact 52 and that the cathode 28 of the device 25 is connected to the input terminals 45 by way of the resistor 39. With the assumed polarity on the input of the device 25, the control electrode 27 will tend to be positive with respect to the cathode 28, and in consequence, there will be an increase in the current flow through the device 25. This increased current flow in the device 25 will cause an increase in the current flow through the resistors 37 and 38. With the increased current flow through the resistor 37, there will be applied to the input of the device 30, between control electrode 32 and cathode 33, a more negative biasing potential which will have the effect of reducing the current flow in the device 30. The decrease in the current flow through the device 30 will cause a reduction in the current flow through the resistor 39 and the resistor 38, and a resultant decrease in the biasing voltage on the device 25.

The biasing voltage for device 25 is supplied by the voltage drop across resistor 39 through a circuit which may be traced from the connection of the cathode 28 to the right end of the resistor 39 and the connection of the control electrode 27 to the left end of the resistor 39 by way of the slider 52, and the input terminals 46 and 45. This decrease in biasing voltage on the device 25 is in the proper direction to reinforce the input signal applied to the input terminals 45 and 46, and is thus regenerative in nature. This regenerative action serves, as those skilled in the art will understand, to increase the gain of the amplifier to a suitably high value.

The output signal on the amplifier output at terminals 43 and 44 or on the output terminals 47 and 48 is in effect the output voltage resulting from the series addition of the voltages existing on the resistors 37, 38, and 39. As was explained by reference to Figure 2, in the absence of an input signal, the sum of the voltages on the resistors 37, 38, and 39 equals zero and the apparatus is balanced. In Figure 3, under the assumed conditions, the sum of the voltage drops across the resistors 37, 38, and 39 is not equal to zero. Thus, with the device 25 conducting more than the device 30 due to the applied input signal, the voltage drop on the resistors 37 and 38 due to the current flow through the device 25 will be such that the right hand terminal of the resistor 37 will have a larger negative voltage thereon than would exist in the balanced state. Likewise, the resistor 38 will have the right hand terminal thereof at a potential which is more negative than was assumed in the balanced state. Inasmuch as the current flow through the resistor 38 and the resistor 39 due to the device 30 is less, the voltage drops due to this smaller current flow will be less with the result that the net voltage drop on the resistor 38 will be negative on the right hand terminal. While the resistor 39 will be positive on the right hand terminal, the magnitude of this positive signal will be less than in the balanced state and when this voltage is combined with the voltage on the resistor 37, the net result will be a voltage which is negative on the right hand terminal of resistor 37.

With the voltage across the resistor 37 being greater than the voltage on resistor 39 and with the voltage on the resistor 38 being negative on the right hand side with respect to the left hand side, the net voltage across resistor 37, 38, and 39 will be negative on the right hand terminal nor on the output terminal 47. Inasmuch as the other output terminal 48 is the same as the left hand terminal of resistor 39, it will be seen that the output voltage between the terminals 47 and 48 will be negative.

Consequently, there is produced on the output terminals 47 and 48 a signal corresponding to the applied input signal but amplified in accordance with the gain of the balanced amplifier. This gain is relatively high due to the regenerative action of the circuits.

In the event the polarity of the input signal on the terminals 45 and 46 is reversed from that assumed above, the output signal polarity will also reverse. Thus, when the terminal 45 is assumed to be positive with respect to the terminal 46, there is an amplified output signal on the terminals 47 and 48, with the terminal 47 now being positive with respect to the terminal 48. It will thus be seen that it is possible to obtain with this amplifying configuration an output signal which is considerably amplified from the magnitude of the input signal and reversible in polarity in accordance with input signal polarity reversals.

It should be noted in connection with Figure 3 that in the event that there is no input signal, there will be no output signal and the apparatus will operate as the balanced amplifier described in connection with Figure 2.

The foregoing explanation of the operation of the apparatus of Figure 3 has been on the assumption that the slider contact 52 has been adjusted to its extreme left hand position on the slide wire 51. The gain, or the proportional band of this amplifying apparatus, may be varied, as desired, over the operating range of the apparatus, by moving the slider 52 along the slide wire 51. It will be noted that the slide wire 51 is effectively connected across the resistors 37, 38, and 39 by reason of a connection from the right hand terminal directly to the terminal 44 of resistor 37 and a connection from the left hand terminal through the input source to the left hand terminal 43 of the resistor 39. By moving the slider 52 to a fixed position on the slide wire 51, there will be a feedback signal from the output of the amplifier which will be dependent upon the position of the slider 52 along the slide wire 51.

On the assumption that the input terminal 45 is negative with respect to the output terminal 46, so that the output terminal 47 is negative with respect to the output terminal 48, the voltage drop across the slide wire 51 will be of such polarity that its right hand terminal will be negative and its left hand terminal positive. With the slider 52 in the mid position, the portion of the negative voltage on the output terminal 47 will be tapped off of the slide wire 51 and will be added to the input signal on terminals 45 and 46. This will result in the application of a smaller error or input signal to the control electrode 27 of device 25, and a corresponding reduction in the output from the apparatus as compared to the output obtained when the slider 52 was in the extreme left hand position. It will thus be seen that movement of the slider 52 along the slide wire 51 can be used to vary the output voltage produced by the amplifier for a given input signal. This is a so-called proportional band adjustment. The ease with which this proportional band adjustment may be made without upsetting the ability of the amplifier section to be balanced and stable enhances the utility of the apparatus.

FIGURE 4

The apparatus disclosed in Figure 4 is based on the same basic amplifier as disclosed in Figure 2. Corresponding components between Figures 2 and 4 carry like reference numerals as is the case with respect to Figure 3. The elements incorporated in the apparatus of Figure 4 are arranged so that the apparatus will act as an integrating circuit while repeating all of the phasing advantages present in Figures 2 and 3. Newly added to the apparatus of Figure 4 over that of Figure 3 is a condenser 55 and an adjustable rheostat 56.

*Operation of Figure 4*

The operation of Figure 4 is basically the same as that of Figure 3 with there being a feedback from the output through the conductor 57, condenser 55 and conductor 58 to the control electrode 27. Thus, with a step input applied to the terminals 45 and 46, with the terminal 46 being positive with respect to the terminal 45, there will be an attempted change in the current bow to the devices 25 and 30 but due to the fact that there is a direct feedback path from the output through the condenser 55 to the input control electrode 27, the attempted current flow change is blocked. In other words, with a step input on terminals 45 and 46, there is an immediate feedback signal through the condenser 55 which bucks out or opposes the input step signal and tends to prevent any change in the current flow in the apparatus. As the step input is a direct current signal, and since condenser 55 can pass only changes in current, the feedback signal from the step input through the condenser 55 will tend to dissipate and there will be a change in the current flow in the devices 25 and 30. With the resultant change in the current flow in the devices 25 and 30 there is again a change in the signal applied across the condenser 55 which results in a feedback signal which tends to stabilize or balance out the input error signal. However, due to the fact that the condenser 55 requires a change, the output signal across the terminals 47 and 48, and also the signal applied to the condenser 55, will slowly increase in magnitude. The rate of increase will be dependent upon the time constant of the charging circuit for the condenser 55. The principal control of the time constant of the charging circuit for the condenser 55 is the rheostat 56 and the charging current circuit may be traced from the terminal 44 through conductor 57, condenser 55, rheostat 56, input terminal 46, to the grounded input terminal 45 which is the same as the output terminal 48. As the resistance of the input circuit between the terminals 45 and 46 is generally relatively small in comparison to the resistor 56, the effect of this input resistance may be neglected so that the primary adjustment is in the adjustment of the rheostat 56.

It will be noted that as long as there is an input signal applied between the terminals 45 and 46, the apparatus will seek to maintain a stabilized condition on the input of the device 25 and in order to maintain that stabilized condition it is necessary for the output signal continually to increase. The result of this continual increase is an integration which will be a function of the input signal. In order to change the rate of integration, it is necessary to change the magnitude of the resistance of rheostat 56. Thus, with the rheostat 56 arranged to have a high resistance, the rate of change of the output signal will be relatively low. On the other hand, if the resistance of the rheostat 56 is relatively low, the rate of change of the output will be relatively high.

After the input signals on the terminals 45 and 46 have been reduced to zero due to the operation of the controller, the condenser 55 will tend to retain its charge and maintain the current unbalance condition between the devices 25 and 30 in the condition in which they were just prior to the reduction of the input signal to zero. As a result, the output signal on the terminals 47 and 48 will also tend to maintain the integrated value of the input signal which has been applied to the input terminals 45 and 46. If the input signal should be reversed in polarity, the net result on the output terminals 47 and 48 will be to eliminate the integrated signal which had been placed there originally and this elimination will take place at a rate dependent upon the integrating rate of the apparatus. Thus, an input signal with a given polarity will produce an integrated output having a positive slope, on the terminals 47 and 48. A signal of reversed polarity will cause the integration to be the opposite or have a negative slope.

It will thus be seen from Figure 4 that the basic balanced amplifier apparatus is well adapted for use in an integrating circuit which is capable of producing both positive and negative signals in accordance with the input polarity. This feature also enhances greatly the utility and adaptability of the apparatus for use in an overall electrical control system.

FIGURE 5

Figure 5:
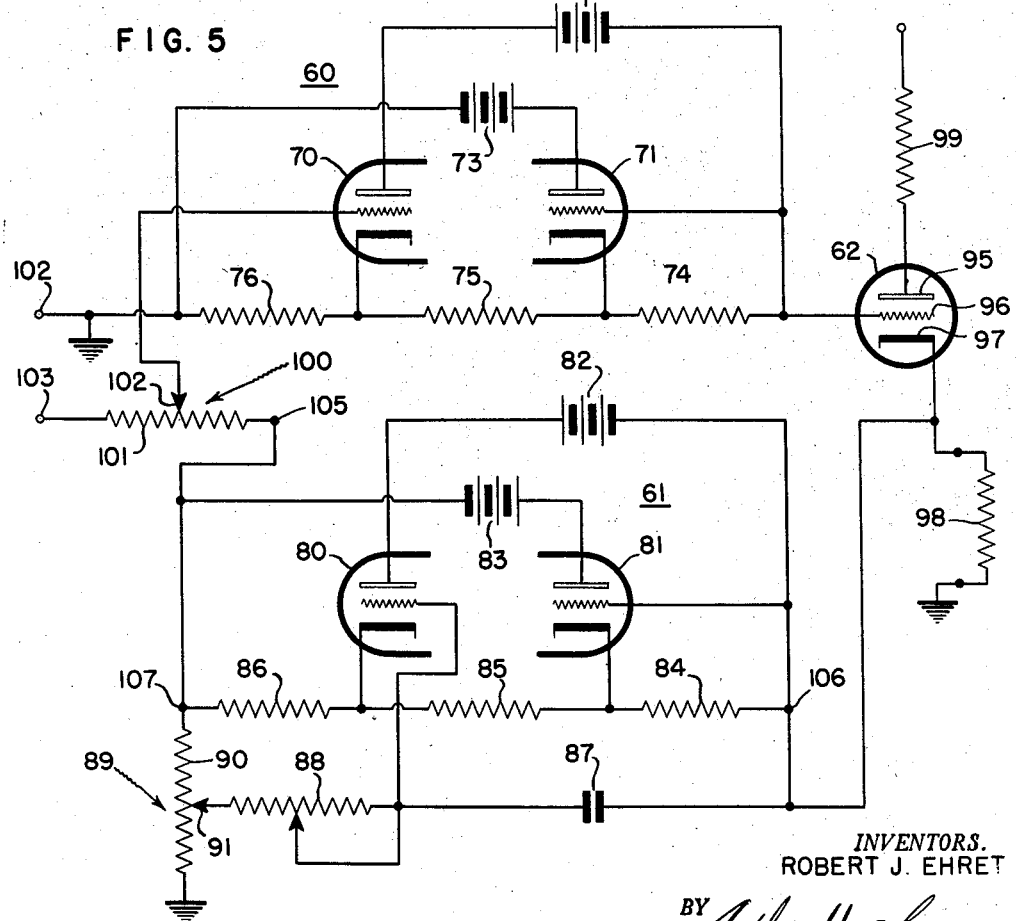
Figure 5 shows the apparatus integrated into a complete electrical control.

The apparatus of Figure 5 shows one manner in which the basic control functions of the apparatus of Figure 3 and Figure 4 can be combined to provide a controller which will have both proportional band control and integration control, with the latter being referred to in servo mechanism language as reset. This apparatus is disclosed in the present application by way of explanation and amplification of the basic utility of the apparatus of Figures 2, 3, and 4. The circuit of Figure 5 is disclosed and claimed in a copending application of William F. Newbold, entitled "Electrical Control Apparatus," filed on even date herewith.

The components of Figure 5 are built up from the apparatus of Figures 3 and 4. The numeral 60 indicates generally the proportional band section of the apparatus and corresponds to the apparatus of Figure 3. The numeral 61 indicates the integrating section of the apparatus which corresponds to the apparatus shown in Figure 4. The proportional band section 60 and the integrating section 61 are interconnected to control the current flow in an output amplifying device 62 with the current flow in the device 62 being proportional to the magnitude of the input signal plus a function which will be proportional to the time-integral of the input signal.

The proportional band amplifying section 60 comprises a pair of electronic amplifying devices 70 and 71. The electronic amplifying device 70 has a power supply therefor indicated by the numeral 72 and the amplifying device 71 has a separate power supply therefor indicated by the numeral 73. Included in the current flow circuit for the device 70, in addition to the battery 72 are a pair of resistors 74 and 75. Included in the current flow circuit for the device 71, in addition to the battery 73, is a further resistor 76 and the aforementioned resistor 75. It will thus be seen that the basic amplifier sections set forth thus far corresponds to the balanced amplifier section shown in Figure 2.

The reset section 61 also comprises a basic balanced amplifier section shown in Figure 2 and includes a pair of electronic amplifying devices 80 and 81. The source of power for the amplifying device 80 is indicated by the numeral 82 while the source of power for the device 81 is indicated by the numeral 83. The current flow circuit for the amplifying device 80 comprises, in addition to the power source 82, a pair of series-connected resistors 84 and 85. The current flow circuit for the amplifying device 81 comprises, in addition to the source of power 83, a resistor 86 as well as the resistor 85. The reset section 61 also includes an integrating condenser 87, as well as a reset rate adjusting rheostat 88. For controlling the magnitude of the input signal to the reset section 61, there is provided a potentiometer 89 having a slide wire 90 and an associated slider 91.

The output device 62 comprises a triode having an anode 95, a control electrode 96, and a cathode 97. There is provided an output resistor 98 which may be connected between the cathode and ground. There is also present a plate resistor 99. While the output is shown at the resistor 98, it will be obvious that the output may be taken from the resistor 99, this latter course being followed when resistance changes in the cathode resistor 98 due to temperature changes become appreciable.

Also included in the aparatus is a proportional band adjusting potentiometer 100 which comprises a slide wire 101 and an associated slider 102.

Operation of Figure 5

In considering the operation of Figure 5, let it be assumed that there is a step input signal applied to the input terminals 102 and 103. Let it further be assumed that the terminal 103 is positive with respect to the terminal 102. The positive signal on terminal 103 will be applied to the control electrode of the device 70 by way of the slide wire 101 and the slider 102. This will cause the device 70 to conduct a greater amount which greater amount will produce a larger biasing action on the device 71 by reason of the current flow through the resistor 74. This will tend to cut down the current flow in the device 71 with the result that the net voltage across the resistors 74, 75, and 76 is negative on the right hand side with respect to ground. In other words, the control electrode 96 of the output control device 62 is negative with respect to its cathode which is connected to ground by way of the cathode resistor 98. With the decrease in the current flow through the device 62 due to the negative biasing action from the section 60 there will be a decrease in the current flow through the cathode resistor 98. Thus, the voltage across the resistor 98 will be less positive than when the current was of a larger magnitude.

The input voltage to the reset section 61 will be the voltage appearing across the potentiometer 89 as picked off by the potentiometer slider 91. The voltage on the potentiometer 89 will be the voltage existing at the right hand terminal 105 of the proportional band potentiomter 100. This voltage is the algebraic sum of the output voltage on the resistor 98 and the output voltage from the reset section 61. The output voltage from this section 61 is taken across the resistors 84, 85, and 86, connected in series. This voltage when considered with respect to the voltage on the resistor 98 will be of a polarity which is opposite to that on the resistor 98. In other words, the voltage on the resistors 84, 85, and 86 will be such that the terminal 106 will be opposite in polarity with respect to the left hand terminal 107. If the voltage on the output of the reset section exactly balances that of the voltage on resistor 98, there will be no net input signal to the reset section and this section will remain in a balanced state. However, as there has been an assumed continuous input error signal, in order for the voltage at the terminal 105 to continue to oppose the voltage on input terminal 103, it is necessary that the output of the reset section continually change in order to supply this balancing voltage. This is due to the action of the reset condenser 87 which slowly charges and tends to dissipate the output signals from the reset section unless the input signal is continually changing.

It should be noted that with a step input signal there will be an immediate feedback to terminal 105 from the resistor 98 by way of the reset section 61. The net signal on the input of the proportional band section will then be dependent upon the setting of the slider 102 on the proportional band slide wire 101. This will result in an immediate step change in the output current of device 62.

The net effect of a step input signal is that the output current in the device 62 will change immediately to a new value and this change will be proportional to the input signal and will be of a magnitude dependent upon the proportional band slider 102 position. As long as the input step signal remains, the output current of the device 62 will continually change to produce an integrated output in accordance with the magnitude of the error and to the time length that this error is present.

If the input signal polarity should be reversed, the operation of this control will likewise reverse. Thus, a step signal of opposite polarity will cause an immediate current change in the output device 62 and if the step input continues, the reset section 61 will introduce an integrated function into the output of the device 62.

As soon as the input error signal has been reduced to zero, the reset section 61 will tend to maintain the controller output current operating at a current level which will maintain the current conducted by the device 62 constant. The magnitude of the reset output signal is dependent upon the setting of the slider 91 on the slide wire 90. Thus, if the slider 91 is positioned near the upper end of the slide wire, the error signal on the input of the section 61 will be greater and the rate of change of the output signal will be greater. If the slider is moved to the lower end of the slide wire 90, the reset output rate will be lower. As with the reset apparatus shown in Figure 4, the reset rate may also be adjusted by rheostat 88.

The necessity for this type of controller may be reviewed when considering Figure 1 where the controller is shown controlling the temperature of furnace 10. If there is a sudden change in the temperature of the furnace 10, it is desired that the valve 21 position be immediately changed to compensate for the temperature change. This change will directly follow changes in the input signal from the thermocouple 11. If the change in the opening of valve 21 does not bring the temperature to the exact desired value, a slow adjustment of the valve should be made to reset the valve to a value which will bring the temperature to the desired value. This is accomplished in the electric controller by the resetting action of reset section 61 which causes a gradual change in the output device 62 which change will cause a resetting of the valve 21.

Figure 6:
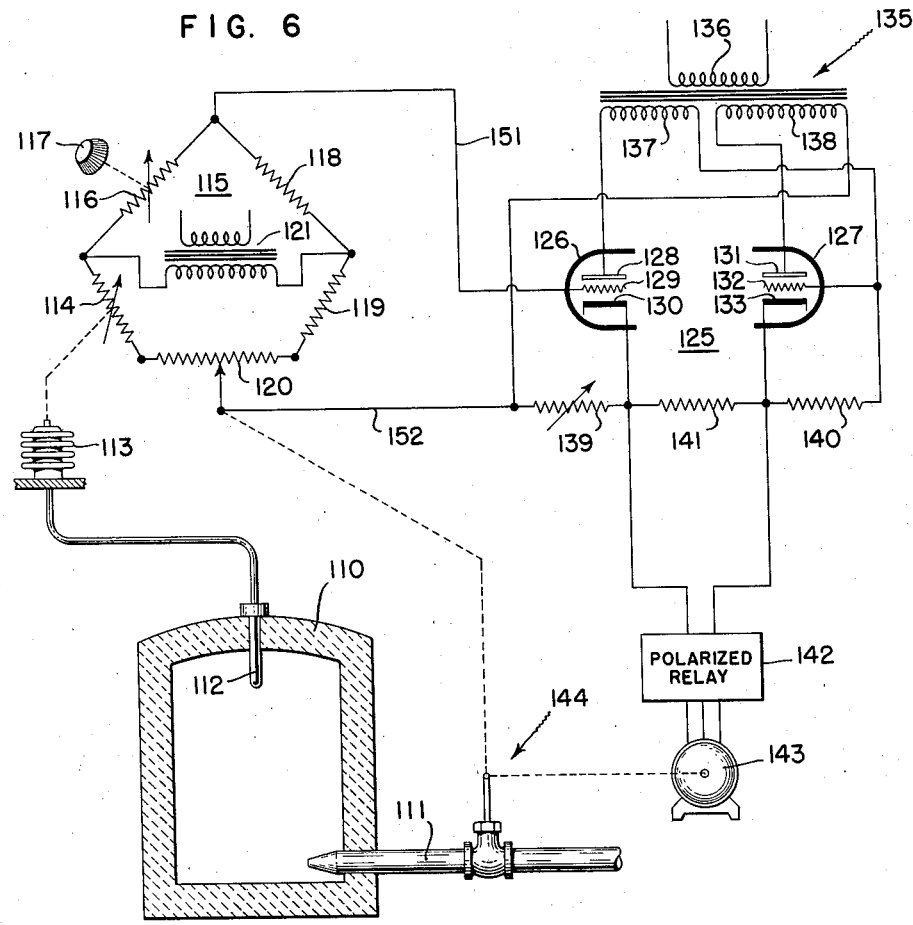
Figure 6 shows the amplifier of the present invention as used in a controller supplied with alternating current.

The apparatus shown in Figure 6 is the alternating current form of the apparatus disclosed in Figure 2. In other words, the input signal to the amplifier portion is alternating current and the amplifier tubes are energized by an alternating current. In this figure, the numeral 110 represents a furnace having gas supplied thereto by a conduit 111 and having the temperature thereof measured by a suitable temperature sensing element 112. The element 112 is effective to create a pressure variation in accordance with the temperature change in the furnace 110 and cause a bellows 113 to be moved in accordance with the temperature changes. The output element 113 is arranged to adjust a resistor 114 which forms one arm of a balanceable electrical bridge network 115. Also present in the bridge network 115 is a manually adjusted resistor 116, arranged to be adjusted by knob 117, a pair of fixed resistors 118 and 119, and a rebalancing resistor in the form of a slide wire potentiometer 120. Power is supplied to the bridge 115 by means of an alternating current transformer 121. The output of the bridge 115 will be an alternating current whose phase will be reversible in accordance with the balance condition of the bridge.

The output of the bridge 115 is connected into the input of a balanced alternating current amplifier 125. This amplifier comprises a pair of electronic amplifying devices 126 and 127. The device 126 comprises an anode 128, a control electrode 129, and a cathode 130. The device 127 comprises an anode 131, a control electrode 132, and a cathode 133. Supplying power to the devices 126 and 127 is a transformer 135 having a primary winding 136 connected to a suitable alternating current power source, not shown, and a pair of secondary windings 137 and 138. Connected on the input of the device 126 is an adjustable resistor 139 and connected on the input of the device 127 is a resistor 140. The output resistor for the apparatus is a resistor 141 which may be considered as the internal resistance of a polarized relay 142. The relay 142 is adapted to reversibly control an electrical motor 143 in accordance with the operation of the relay 142. The motor 143 may be used to adjust a suitable fuel flow control valve 144 as well as the rebalancing potentiometer 120.

The operating principles of the apparatus of Figure 6 are basically the same as those of Figure 2. In the present arrangement with alternating current applied to the anodes 128 and 131, it is essential that the secondary windings 137 and 138, which supply power to the devices 126 and 127, be phased so that the devices 126 and 127 are conductive on the same half cycle.

Under the assumption that there is no unbalance signal originating from the bridge network 115, the control electrode 129 is effectively connected to the left end of the resistor 139. During the conducting half cycle of the apparatus, current will flow through the device 126 in a path which may be traced from the left hand terminal of the secondary 137 through anode 128, cathode 130, resistor 141, resistor 140, back to the right hand terminal of the secondary 137. The current flow for the device 127 may be traced from the left hand terminal of the secondary 138 to anode 131, cathode 133, resistor 141, resistor 139, back to the right hand terminal of the secondary 138. It will be noted that these circuits correspond effectively to the circuits traced in connection with Figure 2. The currents flowing through the resistor 141 are equal in magnitude and opposite in their direction if both the devices 126 and 127 are conducting an equal amount. If that is the case, there is no net signal appearing across the resistor 141. It should also be noted that the current flow from the device 126 passes through the resistor 140 on the input of the device 127. Likewise, the current flow in the device 127 passes through the resistor 139 on the input of device 126. This cross feedback causes the current flow, during the conducting half cycle, to be effectively the same and the adjustment of resistor 139 is provided to insure that this current flow will be the same. Since there is no net output current appearing across the resistor 141, there will be no signal applied to the polarized relay 142 and that should remain in its neutral position so that the motor 143 will remain stationary.

In the event that the bridge network 115 becomes unbalanced so that there is an alternating current unbalance signal on the output leads 151 and 152, this signal will be applied to the input of the device 126. If the phasing is such that the control electrode 129 is positive with respect to the cathode 130, during the conducting half cycle, the device 126 will then be conducting more. If the device 126 conducts more during its conducting half cycle, the current flowing through the resistor 140 will bias the device 127 in a direction to decrease the current flow therethrough. The net result will be a signal across the resistor 141 which will be positive on the left end of the resistor and negative on the right end.

If the polarity of the bridge network 115 should be reversed, the device 126 will conduct less and with the decreased conduction thereof there will be an increase in the conduction or current flow from the device 127 so that now the voltage across the resistor 141 will be of opposite polarity with the right end of the resistor 141 being positive with respect to the left end. As the signal on the resistor 141 reverses in polarity, the polarized relay 142 will be effective to drive the motor 143 in one direction or the other depending upon the direction of unbalance on the bridge 115. Motor 143 will then readjust the valve 144 as well as the bridge rebalancing potentiometer 120. As soon as the output signal from the bridge 115, as it appears upon the conductors 151 and 152, goes to zero, the polarized relay will go to a neutral position where the motor will stop.

The apparatus of Figure 6 is such as to have high gain and because of its self-balancing character, it is possible to use the amplifier section with a very sensitive polarized relay. It is thus possible to obtain very close control of the temperature 112 with a minimum dead spot area or neutral area in the polarized relay since there is no danger of the apparatus drifting wtih aging into a condition where the polarized relay will be actuated.

While the electric controller has been shown and described in connection with a furnace control, it is obvious that the controller has a universal application to any type of process control wherein a variable must be maintained at a precise magnitude or value. Further, while the controller has been shown in a particular form in Figure 5, the individual sections of the controller may be used separately depending upon the particular control problem involved.

While, in accordance with the provisions of the statutes, there have been illustrated and described the best forms of the embodiments of the invention known, it will be apparent to those skilled in the art that changes may be made in the form of the apparatus disclosed without departing from the spirit of the invention as set forth in the appended claims and that in certain cases, certain features of the invention may be used to advantage without a corresponding use of other features.

Having now described my invention, what I desire to secure by Letters Patent, is:

1. In an electrical controller circuit, the combination comprising, a pair of independently energized electronic amplifying devices each having an input and an output, a controller input circuit and a controller output circuit, means connecting the output of each of said devices in opposition to the other of said devices in said controller output circuit, a degenerative feedback connection from said controller output circuit to said controller input circuit, and means connecting the output of each of said devices to the input of the other of said devices so that unbalance conditions in said devices will be balanced in said controller output.

2. In an electrical controller circuit, the combination comprising, a pair of independently energized electronic amplifying devices each having an input and an output, a controller input circuit and a controller output circuit, means connecting the output of each of said devices in opposition to the other of said devices in said controller output circuit, a degenerative feedback connection from said controller output circuit to said controller input circuit, an adjustable impedance in said feedback to vary the gain of said controller, and means connecting the output of each of said devices to the input of the other of said devices so that unbalance conditions in said devices will be balanced in said controller output.

3. In an electrical controller circuit, the combination comprising, a first electronic amplifying device having an input and an output, a second electronic amplifying device having an input and an output, means connecting said outputs in series opposition to form the controller output circuit, means connecting a portion of the output of each of said devices to the input of the other of said devices, a controller signal input circuit connected to the input of one of said devices, and a condenser connected between said controller output and said controller input, said condenser completing an electrical input rebalancing signal circuit and slowly assuming a change which is dependent upon the magnitude of the input signal and its duration.

4. An electrical controller circuit comprising, a first electronic amplifying device having an input and an output, a first source of power, a pair of resistors connected in a series circuit with said first power source and an energizing circuit for said first device, a second electronic amplifying device having an input and an output, a second source of power, a further resistor, means connecting said second source of power, said further resistor, one of said pair of resistors, and said second device in a series circuit, means connecting the input of said first device to one of said pair of resistors, a controller input means connecting the input of said second device to a signal source, a controller output circuit which includes all of said series connected resistors, and a degenerative feedback connection from said controller output circuit to the input of said second device.

5. An electrical controller circuit, comprising, a first electronic amplifying device having an input control electrode, a first source of power, first, second and third impedances, means including said first and second impedances connecting said first source in a series energizing circuit to said first amplifying device, a second amplifying device having an input control electrode, a second source of power, means including said second and third impedances connecting said second source in a series energizing circuit to said second amplifying device, a connection between the control electrode of said first device and said third impedance, a controller input connection to the control electrode of said second device, and a controller output including said first, second, and third impedances connected in series.

6. An electrical controller circuit, comprising, a first electronic amplifying device having an input control electrode, a first source of power, first, second and third impedances, means including said first and second impedances connecting said first source in a series energizing circuit to said first amplifying device, a second amplifying device having an input control electrode, a second source of power, means including said second and third impedances connecting said second source in a series energizing circuit to said second amplifying device, a connection between the control electrode of said first device and said third impedance, a controller input connection to the control electrode of said second device, a controller output including said first, second, and third impedance, and a negative feedback connection from said controller output to said control electrode of said second device.

7. An electrical controller circuit, comprising, a first electronic amplifying device having an input control electrode, a first source of power, first, second and third impedances, means including said first and second impedances connecting said first source in a series energizing circuit to said first amplifying device, a second amplifying device having an input control electrode, a second source of power, means including said second and third impedances connecting said second source in a series energizing circuit to said second amplifying device, a connection between the control electrode of said first device and said third impedance, a controller input connection to the control electrode of said second device, a controller output including said first, second, and third impedance, and a negative feedback connection from said controller output to said control electrode of said second device, said negative feedback connection comprising a condenser which is a part of a circuit having a relatively long time constant.

8. An electrical controller circuit, comprising, a first electronic amplifying device having an input control electrode, a first source of power, first, second and third impedances, means including said first and second impedances connecting said first source in a series energizing circuit to said first amplifying device, a second amplifying device having an input control electrode, a second source of power, means including said second and third impedances connecting said second source in a series energizing circuit to said second amplifying device, a connection between the control electrode of said first device and said third impedance, a controller input connection to the control electrode of said second device, a controller output including said first, second, and third impedance, and a negative feedback connection from said controller output to said control electrode of said second device, said negative feedback connection comprising a potentiometer having a slider with the slider connected to the control electrode of said second discharge device.

9. An electrical circuit comprising, a first electronic amplifying device having an input and an output, a first source of power, a pair of impedances connected in a series circuit with said source of power in an energizing circuit for said first device, a second electronic amplifying device having an input and an output, a second source of power, a further impedance having a magnitude equal to the magnitude of one of said impedances, means connecting said second source of power, said further impedance, the other of said pair of impedances, and said second device in a series circuit, means connecting the input of said first device to one of said pair of impedances, and means connecting the input of said second device to said one impedance and to a signal source, said first and second power sources comprising alternating current sources which are phased in their connections to said amplifying devices so that both of said devices are conductive on the same half cycle.

10. In an electrical controller, the combination comprising, a first electronic amplifying device having a first source of power and a first and a second resistor connected in series therewith in a closed series circuit, a second electronic amplifying device having a second source of power and said second and a third resistor connected in series therewith in a closed series circuit, a first input terminal connected to one end of said first resistor, a controller output circuit including said first, second and third resistors connected in series, a degenerative feedback connection from one terminal of said output to a second input terminal and including an impedance having an adjustable impedance tap thereon, means connecting said tap to an input control electrode of said second amplifying device, and means connecting one end of said third resistor to an input control electrode of said first amplifying device.

References Cited in the file of this patent

UNITED STATES PATENTS

| Number | Name | Date |
|---|---|---|
| 2,138,891 | Soller | Dec. 6, 1938 |
| 2,201,345 | Percival | May 21, 1940 |
| 2,324,797 | Norton | July 20, 1943 |
| 2,412,227 | Och et al. | Dec. 10, 1946 |
| 2,464,594 | Mahoney | Mar. 15, 1949 |
| 2,542,160 | Stoner et al. | Feb. 20, 1951 |
| 2,579,528 | Williams | Dec. 25, 1951 |
| 2,631,198 | Parisoe | Mar. 10, 1953 |
| 2,652,458 | Miller | Sept. 15, 1953 |
| 2,687,474 | Richmond | Aug. 24, 1954 |

FOREIGN PATENTS

| Number | Country | Date |
|---|---|---|
| 412,182 | Great Britain | June 19, 1934 |